US008979264B2

United States Patent
Rathjen

(10) Patent No.: US 8,979,264 B2
(45) Date of Patent: Mar. 17, 2015

(54) DEVICE AND METHOD FOR DEFLECTING A LASER BEAM

(75) Inventor: Christian Rathjen, Bremen (DE)

(73) Assignee: SIE AG, Surgical Instrument Engineering (CH)

(*) Notice: Subject to any disclaimer, the term of this patent is extended or adjusted under 35 U.S.C. 154(b) by 935 days.

(21) Appl. No.: 12/557,955

(22) Filed: Sep. 11, 2009

(65) Prior Publication Data

US 2010/0067079 A1    Mar. 18, 2010

Related U.S. Application Data

(60) Provisional application No. 61/097,300, filed on Sep. 16, 2008.

(51) Int. Cl.
*A61B 3/10* (2006.01)
*G02B 26/10* (2006.01)

(52) U.S. Cl.
CPC .................................. *G02B 26/105* (2013.01)
USPC ............................................ 351/205; 351/246

(58) Field of Classification Search
CPC ........ A61B 3/103; A61B 3/02; A61B 3/1015; A61B 3/12; A61B 3/14
USPC .................... 351/200, 205, 246; 606/2–19
See application file for complete search history.

(56) References Cited

U.S. PATENT DOCUMENTS 6,341,030 B1    1/2002  Takeshita et al.
6,884,960 B2 *  4/2005  Bourne et al. ........... 219/121.69
7,384,159 B2 *  6/2008  Takeda .......................... 353/94
2002/0193704 A1* 12/2002  Goldstein et al. ............ 600/558
2005/0046936 A1    3/2005  Dixon et al.
2005/0228366 A1   10/2005  Kessler et al.

FOREIGN PATENT DOCUMENTS

| EP | 0520388 | 12/1992 |
|---|---|---|
| EP | 1279386 | 1/2003 |
| EP | 1557710 | 7/2005 |
| EP | 1587310 | 10/2005 |
| JP | 63225216 | 9/1988 |
| JP | 05281485 | 10/1993 |
| JP | 06175057 | 6/1994 |
| JP | 2005189580 | 7/2005 |
| JP | 2005296624 | 10/2005 |
| WO | WO2006074898 | 7/2006 |

* cited by examiner

*Primary Examiner* — James Greece
(74) *Attorney, Agent, or Firm* — Ostrolenk Faber LLP

(57) ABSTRACT

For deflecting a laser beam (200) with a deflection mirror (21) arranged displaceably about a rotation axis (c), a beam-shaping optical element (22) is disposed upstream of the deflection mirror (21), said optical element being designed to project the laser beam (200) onto the deflection mirror (21) with a beam width that is reduced in the direction of the rotation axis (c). The deflection mirror (21) has a mirror width which is oriented in the direction of the rotation axis (c) and which is narrower than an unreduced input beam width of the laser beam (200) upstream of the beam-shaping optical element (22). Moreover, a beam-shaping optical element (23) is disposed downstream of the deflection mirror (21), said optical element forwarding the laser beam (202) from the deflection mirror (21) with a beam width corresponding to the unreduced input beam width. The reduction of the mirror width and thus of the mass of the deflection mirror (21) that is made possible by the narrowing of the beam width permits the use of smaller scanning drives (20) with a lower energy requirement for the same or an even higher scanning speed.

15 Claims, 2 Drawing Sheets

DEVICE AND METHOD FOR DEFLECTING A LASER BEAM

CROSS-REFERENCE TO RELATED APPLICATION

The present application claims benefit of and priority to U.S. Provisional Patent Application Ser. No. 61/097,300 filed Sep. 16, 2008 and entitled VORRICHTUNG UND VERFAHREN ZUM ABLENKEN EINES LASERSTRAHLS, the entire content of which is hereby incorporated by reference herein.

BACKGROUND

1. Technical Field

The present invention relates to a device and a method for deflecting a laser beam. The present invention relates, in particular, to a device and a method for deflecting a laser beam with a deflection mirror arranged displaceably about a rotation axis.

2. Related Art

For the purpose of scanning an image region or a working region in the course of material processing, light beams (laser beams) are deflected in one or two scanning directions (x/y scanning direction) by means of suitable deflection devices (scanners). Preferably, in order to avoid vignetting, in this case approximately collimated light beams are pivoted about the centre of the entrance pupil of a focusing optical unit. The deflection of the light beams is generally performed with pivotable mirrors, for example with galvano scanners, piezo scanners, polygon scanners or resonance scanners.

WO2006074898 describes a laser treatment apparatus which images a laser beam with the aid of two mirrors mounted on galvano scanners, and with intermediate imagings through a relay optical unit in each case, into the entrance pupil of an objective.

EP1584310 describes a system having two scanning axes with only one relay optical unit, but in return with an additional synchronously moved mirror for the second scanning axis, which mirror prevents the beam deflected by the second scanning axis from impinging on the first rotation axis outside its centre of rotation.

EP 1 557 710 describes an optical scanner for imaging apparatuses such as a printer, copier or fax machine, in which the light beam impinges obliquely on a deflection mirror during the imaging process, said deflection mirror being embodied such that it is narrower in the direction of the rotation axis. In accordance with EP 1 557 710, the light beam is projected onto the deflection mirror with a beam width that is reduced but surpasses the mirror width ("overfilled" scanner). In order to counteract an imaging of the deflected light beam that is rotated depending on the deflection angle of the mirror (by axial rotation), the deflected light beam is thereby trimmed depending on the rotation angle.

U.S. Pat. No. 6,341,030 describes a further "overfilled" scanner for imaging apparatuses, in which the light beam impinges obliquely on deflection mirrors embodied as facets of a rotating polygon mirror, the light beam width reduced by optical beam-shaping means surpassing the mirror width of the individual facets in the scanning direction.

In order to produce high scanning speeds, mirrors with the lowest possible inertia (that is to say, in particular, small mirrors) are desirable. In this case, on account of fundamental optical laws for given imaging parameters of the focusing optical unit (focus size, working distance and image field height), the mirror size cannot be reduced without thereby simultaneously increasing the scanning angle. Conversely, the beam diameter has to be increased for a likewise speed-increasing smaller scanning angle. Formally, the product of beam diameter and scanning angle is a constant of the optical system. The simultaneous reduction of the mirror diameter and of the scanning angle desired for the purposes of increasing the speed fundamentally cannot be realized.

SUMMARY

It is an object of the present invention to propose a device and a method for deflecting a laser beam with a deflection mirror displaceable about a rotation axis which do not have at least some disadvantages of the known systems. It is in particular an object of the present invention to propose a device and a method for deflecting a laser beam which enable high scanning speeds as a result of a reduction of the size of the deflection mirror, without necessitating an increase in the scanning angle for this purpose.

According to the present invention these aims are achieved in particular by means of the elements of the independent claims. Further advantageous embodiments additionally emerge from the dependent claims and the description.

The aims mentioned above are achieved by means of the present invention in particular by virtue of the fact that for deflecting a laser beam with a deflection mirror arranged displaceably about a rotation axis, a beam-shaping optical element is disposed upstream of the deflection mirror, said optical element being designed to project the laser beam onto the deflection mirror with a beam width that is reduced in the direction of the rotation axis. That is to say that the beam-shaping optical element disposed upstream brings about a convergence of the laser beam to a longitudinal axis of the deflection mirror, said longitudinal axis being orthogonal with respect to the rotation axis. In the case of a laser beam having a substantially circular beam cross section, the transformation of the beam-shaping optical element brings about for example a projection with a narrow, elongate elliptical cross section of the laser beam onto the deflection mirror. The deflection mirror has a mirror width which is oriented in the direction of the rotation axis and which is narrower than the unreduced input beam width of the laser beam upstream of the beam-shaping optical element. The unreduced input beam width of the laser beam is at least 15 mm, for example. The reduced beam width on the deflection mirror is for example 5-25% of the input beam width. The laser beam thus lies completely on the deflection mirror with the reduced beam width. That is to say that the cross section of the laser beam projected onto the deflection mirror is not wider on the deflection mirror than the mirror width of the deflection mirror which is oriented in the direction of the rotation axis. The entire cross section of the projected laser beam lies on the deflection mirror and does not exceed the mirror width of the deflection mirror. Preferably, the cross section of the projected laser beam on the deflection mirror is narrower than the mirror width of the deflection mirror which is oriented in the direction of the rotation axis. The projection and deflection of the laser beam with its entire, untrimmed cross section on the mirror surface (that is to say without exceeding mirror width and mirror height) is energy-efficient and enables, in pulsed laser systems, the transmission of (identical) pulse energies independently of the deflection angle (scanning angle). Since, in contrast to known solutions for imaging apparatuses (by "overfilled" scanning), the laser beam is not trimmed in cross section at the deflection mirror, the beam or pulse energy that is otherwise reduced by trimming is maintained, which is necessary for material-processing applications with focused projection of laser pulses, e.g. during the processing and resolution of eye tissue.

In a less preferred embodiment variant, the beam width is not simply reduced in the direction of the rotation axis, rather the laser beam is projected convergently onto the deflection mirror (focusing). As a result, although a smaller deflection mirror can likewise be used, in return the optical unit disposed downstream has to be provided with a wider pupil.

The narrowing (convergent) transformation of the laser beam in the rotation axis lying orthogonally with respect to the scanning direction takes account of the circumstance that the fundamental restrictions mentioned above apply only to the scanning plane. Orthogonally to the scanning plane, that is say in the direction of the rotation axis, the light beam can be deformed without violating conformity to these fundamental laws for scanner systems.

As a result of the narrowing (convergence) of the beam width in the direction of the rotation axis (orthogonally to the scanning plane), it is thus possible to use a deflection mirror having a width that is reduced in the same direction. By virtue of the reduced dimensions of the deflection mirror, the mass and mass inertia thereof are consequently also significantly reduced. As a result of the reduction of the mass inertia, it is possible to use smaller and thus lighter scanning drives with a lower energy requirement for the same or an even higher scanning speed.

Preferably, a beam-shaping optical element is disposed downstream of the deflection mirror, said optical element being designed to forward substantially collimated the laser beam from the deflection mirror, with a beam width corresponding to the unreduced input beam width in the direction of the rotation axis. Since the width of the laser beam that is oriented in the direction of the rotation axis tapers from the first beam-shaping optical element disposed upstream towards the deflection mirror (convergent light beams), this laser beam width correspondingly widens again as a result of the reflection at the deflection mirror (divergent reflected light beams). The second beam-shaping optical element disposed downstream of the deflection mirror is designed to narrow the beam width in the direction of the rotation axis and thereby shape the laser beam in such a way that the laser beam width that widens starting from the deflection mirror in the direction of the rotation axis is transformed to a constant laser beam width. That is to say that the beam-shaping optical element disposed downstream brings about a convergence of the widened laser beam that is deflected and reflected by the deflection mirror in order to compensate for the beam widening. In this case, the second beam-shaping optical element is positioned (distanced) with respect to the deflection mirror in such a way that the cross section of the emerging laser beam substantially corresponds to that of the original untransformed laser beam upstream of the first beam-shaping optical element disposed upstream. The second beam-shaping optical element disposed downstream of the deflection mirror thus reverses the transformation of the first beam-shaping optical element disposed upstream of the deflection mirror, such that the laser beam is forwarded by the second beam-shaping optical element substantially with the same beam cross section (width, shape) as when it originally arrived at the first beam-shaping optical element. In the case of a laser beam having a substantially circular original beam cross section which is projected onto the deflection mirror with an elliptical cross section, the second beam-shaping optical element shapes the laser beam for example again with a substantially circular cross section.

Depending on the embodiment variant, the beam-shaping optical element disposed upstream of the deflection mirror or respectively the beam-shaping optical element disposed downstream of the deflection mirror is configured as a cylindrical lens or as a diffractive optical element, where here the term cylindrical lens is intended representatively also to denote refractive optical elements having an effect identical to that of a cylindrical lens or an effect corresponding to a cylindrical lens, with improved correction of aberrations.

Preferably, the deflection mirror has a reflective front side configured substantially elliptically, the mirror length (ellipse length) of the front side that runs orthogonally with respect to the rotation axis being a multiple of the mirror width (ellipse width) of the front side that runs in the direction of the rotation axis.

In one embodiment variant, the rear side of the deflection mirror that is remote from the reflective front side of the deflection mirror is rounded in streamlined fashion. As a result, power losses caused by flow resistance can be reduced or, with the power remaining the same, higher scanning speeds (scanning frequencies) and/or displacements (amplitudes) can be realized.

In a further embodiment variant, the deflection mirror is stiffened in the longitudinal direction running orthogonally with respect to the rotation axis. The stiffening of the deflection mirror orthogonally to the rotation axis prevents flexural vibrations of the deflection mirror that would bring about a deformation of the wavefront of the laser beam.

Preferably, the deflection mirror is coupled to a drive, in particular to an oscillator, for displacing the deflection mirror about the rotation axis. Preferably, the deflection mirror is pivoted back and forth in oscillatory fashion about the rotation axis.

In an embodiment of the deflection device (in accordance with one of the variants mentioned above) in an opthalmological device, laser beam is for example a laser beam pulsed with femtosecond laser pulses, and a light projector for the focused projection of the femtosecond laser pulses for a resolution of eye tissue is disposed downstream of the deflection mirror.

In one embodiment variant, two deflection devices of the type described above are cascaded, the first of the deflection devices being designed to deflect the laser beam in a first deflection direction, and the second of the deflection devices being designed to deflect the laser beam in a second deflection direction, which is orthogonal to the first deflection direction. The device formed from the two cascaded deflection devices thus comprises a second deflection device disposed downstream of the first deflection mirror of the first deflection device and having a second deflection mirror for deflecting the laser beam in a second deflection direction, which is orthogonal to the deflection direction of the first deflection mirror, and a relay optical unit for intermediate imagings for imaging the laser beam deflected by the first deflection mirror into an entrance pupil of the second deflection device disposed downstream. In one variant, the second deflection device is embodied as a mirror which, although it does not itself have a pupil, is arranged in the entrance pupil for example of a focusing optical unit or a further relay optical unit.

BRIEF DESCRIPTION OF THE DRAWINGS

An embodiment of the present invention is described below on the basis of an example. The example of the embodiment is illustrated by the following accompanying figures.

DETAILED DESCRIPTION OF THE EMBODIMENTS

Figure 1:
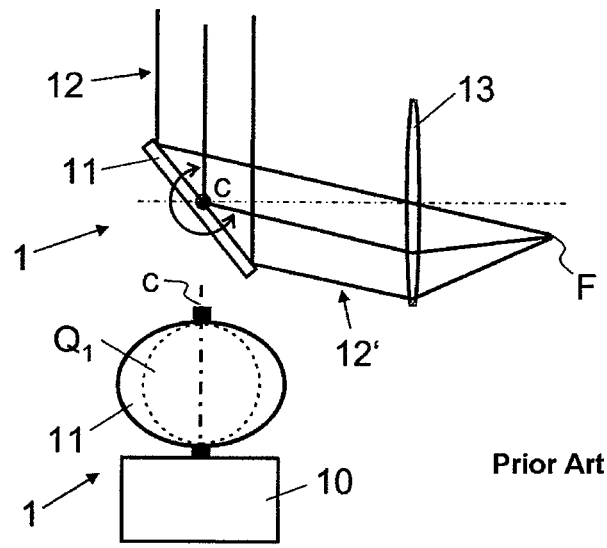
FIG. 1 shows schematically in cross section and in plan view a device for deflecting a laser beam with a deflection mirror in accordance with the prior art.

In FIG. 1, the reference symbol 1 refers in each case to a deflection device in accordance with the prior art, which is illustrated schematically in cross section in the upper part of the figure and schematically in plan view in the lower part of the figure. The deflection device 1 comprises a deflection mirror 11 displaceable about the rotation axis c. The deflection mirror 11 is coupled to a drive 10, which displaces the deflection mirror 11, such that the incoming light beam 12, preferably a substantially collimated laser beam, is deflected in a scanning plane arranged orthogonally with respect to the rotation axis c. The deflected light beam 12' is projected onto a focal point F by a light projector 13 disposed downstream of the deflection mirror 11. As can be seen in the lower part of FIG. 1, the light beam has a substantially circular cross section $Q_1$. The deflection mirror 11 is configured elliptically and has in the direction of the rotation axis c a mirror width corresponding at least to the beam width of the light beam 12.

Figure 2:
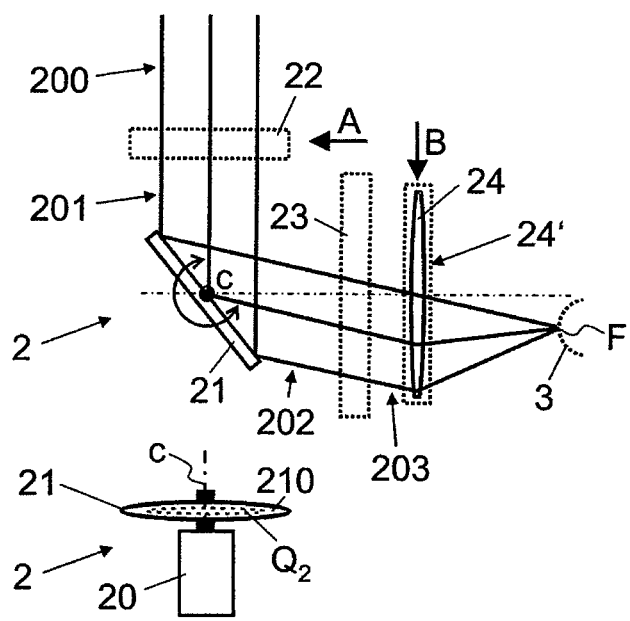
FIG. 2 shows schematically in cross section and in plan view an embodiment according to the invention of a device for deflecting a laser beam with a deflection mirror.
Figure 3:
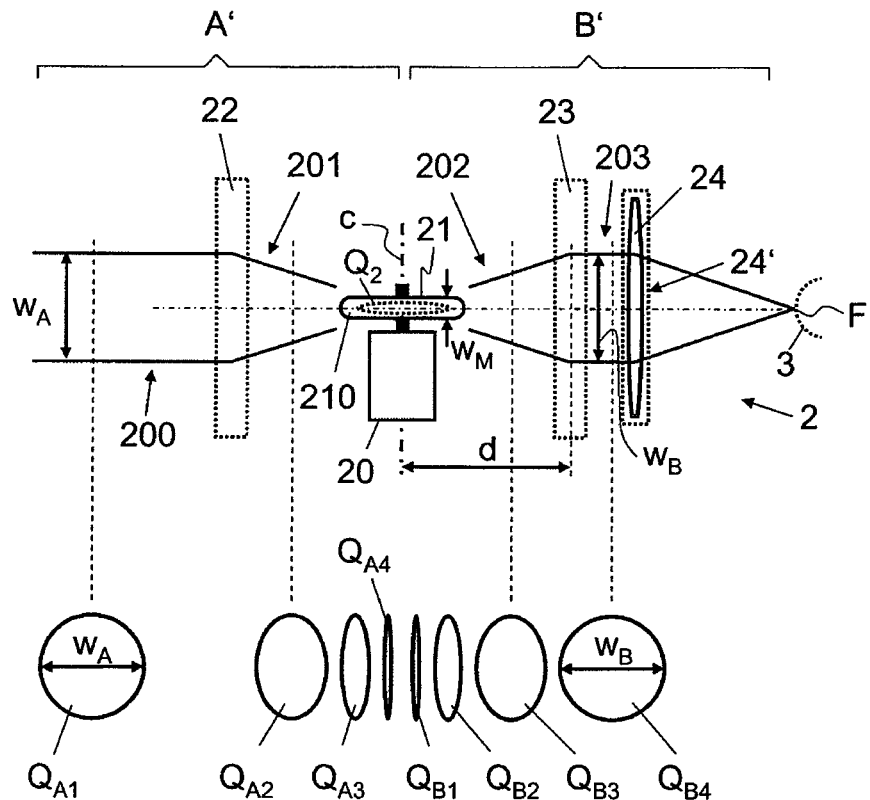
FIG. 3 schematically shows a combined view of the beam path from two perspectives that reveal the alteration of the beam width with respect to the rotation axis of the deflection mirror.

In FIGS. 2 and 3, the reference symbol 2 refers in each case to an embodiment according to the invention of a deflection device for deflecting a substantially collimated light beam, in particular a laser beam 200. In one embodiment variant, the laser beam 200 is a laser beam pulsed with femtosecond laser pulses.

The deflection device 2 comprises a deflection mirror 21 displaceable about the rotation axis c, said deflection mirror being coupled to a drive 20. The drive 20 is designed to displace the deflection mirror 21 about the rotation axis c, preferably in an oscillatory (pivoting back and forth) movement. The drive 20 is embodied for example as an oscillator, e.g. with the aid of a piezo or galvano drive.

The deflection device 2 additionally comprises a beam-shaping optical element 22 arranged in a manner disposed upstream of the deflection mirror 21. The beam-shaping optical element 22 disposed upstream is embodied for example as a cylindrical lens (including refractive optical elements having an effect identical to that of a cylindrical lens and possibly improved correction of aberrations), or as a diffractive optical element and is embodied in such a way that the original beam width $w_A$ (input beam width) of the incoming laser beam 200 is reduced in the direction of the rotation axis c, that is to say is converged to a longitudinal axis of the deflection mirror 21, said longitudinal axis running orthogonally with respect to the rotation axis c.

The region A' of FIG. 3 illustrates the view of the laser beam from the perspective indicated in FIG. 2 by the arrow A running orthogonally with respect to the rotation axis c. As can be seen in FIG. 3, the laser beam 201 shaped by the beam-shaping optical element 22 has a tapering (convergent) beam width in the direction of the rotation axis c. That is to say that the beam-shaping optical element 22 narrows the beam width in the direction of the rotation axis c such that the shaped (convergent) laser beam 201 is projected onto the deflection mirror 21 with an elliptical cross section $Q_2$. Proceeding from an original substantially circular cross section $Q_{A1}$ of the incoming laser beam 200, the beam width that is oriented in the direction of the rotation axis c tapers, such that the shaped laser beam 201 has an elliptical cross section $Q_{A2}$, $Q_{A3}$, $Q_{A4}$ with a substantially constant ellipse length corresponding to the original beam width $w_A$ of the incoming laser beam 200, and with an ellipse or beam width that decreases continuously towards the deflection mirror 21. The beam width, oriented in the direction of the rotation axis c, of the shaped laser beam 201 projected onto the deflection mirror 21 is for example between 5-20% of the original beam width $w_A$.

Figure 4:
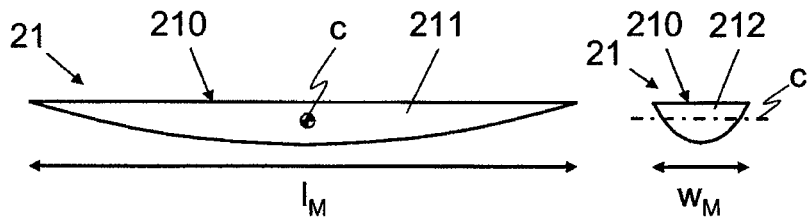
FIG. 4 shows by way of example cross sections of the deflection mirror with a rear side configured in streamlined fashion.

The deflection mirror 21 has an elongate, for example elliptically configured reflective front side 210. The mirror length $l_M$ (ellipse length) of the front side 210 that runs orthogonally with respect to the rotation axis c is a multiple of the mirror width $w_M$ (ellipse width) of the front side 210 that is oriented in the direction of the rotation axis c. The mirror width $w_M$ of the deflection mirror 21 that is oriented in the direction of the rotation axis c is narrower than the original beam width $w_A$ of the incoming laser beam 200 in accordance with the reduced beam width of the shaped laser beam 201 projected onto the deflection mirror 21. By way of example, the mirror width $w_M$ of the deflection mirror 21 that is oriented in the direction of the rotation axis c is 5-25% of the original beam width $w_A$. As is illustrated schematically in FIG. 4 by the cross section 211 running along the longitudinal axis and the cross section 212 running through the rotation axis c, the rear side of the deflection mirror 21 that is remote from the front side 210 is rounded in streamlined fashion. The rounding of the rear side additionally stiffens the deflection mirror 21 in the longitudinal direction thereof.

The region B' of FIG. 3 illustrates the view of the laser beam from the perspective indicated in FIG. 2 by the arrow B running orthogonally with respect to the rotation axis c. As can be seen in FIG. 3, the beam width that is oriented in the direction of the rotation axis c widens on account of the reflection at the deflection mirror 21 continuously with increasing distance from the deflection mirror 21 (divergent light beams). That is to say that the laser beam 202 that is deflected and reflected by the deflection mirror 21 has an elliptical cross section $Q_{BE}$, $Q_{B2}$, $Q_{B3}$ having a substantially constant ellipse length corresponding to the original beam width $w_A$ of the incoming laser beam 200, and an ellipse or beam width that continuously increases proceeding from the elliptical cross section $Q_2$ projected on the deflection mirror 21, in the direction of the rotation axis c.

The deflection device 2 additionally comprises a further beam-shaping optical element 23, which is arranged in a manner disposed downstream of the deflection mirror 21. The beam-shaping optical element 23 disposed downstream is configured for example as a cylindrical lens (including refractive optical elements having an effect identical to that of a cylindrical lens and possibly improved correction of aberrations) or as a diffractive optical element and is embodied such that the increasing beam width of the deflected laser beam 202 that is oriented in the direction of the rotation axis c is reduced again to a constant beam width oriented in the direction of the rotation axis c. As is illustrated schematically in FIG. 3, the beam-shaping optical element 23 is arranged at a distance d from the deflection mirror 21 for which the beam width of the deflected laser beam 202 that is oriented in the direction of the rotation axis c again corresponds to the original beam width $w_A$ of the incoming laser beam 200. The beam-shaping optical element 23 thus reduces the beam width of the deflected laser beam 202 that is oriented in the direction of the rotation axis c to a constant beam width $w_B$ corresponding to the original beam width $w_A$ of the incoming laser beam 200. The beam-shaping optical element 23 feeds the substantially collimated laser beam 203 to the light projector 24 disposed downstream, with a substantially circular cross section $Q_{B4}$ corresponding to the original cross section $Q_{A1}$ of the incoming laser beam 200.

The light projector 24 is e.g. a projection or focusing optical unit having one or more projection lenses which projects the collimated laser beam 203 in focused fashion onto a focal point F. In one embodiment, the deflection device 2 is integrated into an opthalmological device and the light projector 24 is designed to project the collimated laser beam 203, in particular femtosecond laser pulses, for a punctiform resolution of eye tissue 3, as illustrated schematically in FIG. 3, onto a focal point F in or on the eye tissue 3.

It should additionally be emphasized at this point that, in further embodiment variants, further optical components are arranged in the beam path between the beam-shaping optical elements 22 and 23, for example beam-deflecting optical elements for an additional orthogonal deflection of the laser beam (conventional xy double scanner arrangement). Furthermore, a deflection in polar coordinates is conceivable if an image rotator is additionally used. A deflection in two mutually orthogonal deflection directions can also be achieved by means of a cascading of two deflection devices 2 that are respectively provided for a deflection of the laser beam in a deflection direction. For imaging the deflected laser beam into the entrance pupil of the projection or focusing optical unit of a light projector or a deflection device disposed downstream, it is additionally also possible to provide relay optical units for intermediate imagings, as is shown for example in WO2006074898 and EP1584310.

For adjusting focus in the projection direction z, either the light projector 24 is adjusted, or the divergence of the laser beam at the input of the scanner system.

In one embodiment variant, possible wavefront aberrations of the beam-shaping optical elements 22, 23 are compensated for by compensation elements, disposed upstream or downstream, in a further variant compensation elements also being part of the beam-shaping elements 22, 23.

In one embodiment variant, the beam-shaping optical element 23 is arranged at a distance and provided with a refractive power such that either a beam diameter that is different from the original beam width $w_A$ of the incoming laser beam 200 or a focusing effect is achieved. By way of example, as is illustrated schematically in FIGS. 2 and 3, the spherical element of the light projector 24 can be replaced by a further beam-shaping optical element 24', e.g. in the form of a cylindrical lens (including refractive optical elements having an effect identical to that of a cylindrical lens and possibly improved correction of aberrations), the axis of which is oriented orthogonally with respect to the beam-shaping optical element 23. If the refractive power of the element 23 is correspondingly increased, then the same focusing effect as with the spherical element of the light projector 24 arises in combination with the further beam-shaping element 24'. Consequently, the element 23 functionally becomes part of the light projector 24.

The image fields of the light projector 24 can be planar or alternatively curved for application onto a cornea.

Although the present invention has been described in relation to particular embodiments thereof, many other variations and modifications and other uses will become apparent to those skilled in the art.

What is claimed is:

1. An opthalmological device for treating eye tissue, the device comprising a device for deflecting a laser beam with a deflection mirror arranged displaceably about a rotation axis running parallel to a reflective mirror surface of the deflection mirror, such that the laser beam reflected by the deflection mirror runs in a scanning plane being arranged orthogonally with respect to the rotation axis, the opthalmological device further comprising:

a light projector disposed downstream of the deflection mirror and configured for focused projection of the laser beam for a resolution of eye tissue, and a beam-shaping optical element disposed upstream of the deflection mirror, said optical element being configured and operable to converge the laser beam towards a longitudinal axis of the deflection mirror, said longitudinal axis being orthogonal to the rotation axis, and to project the laser beam onto the deflection mirror with a beam width that is reduced in the direction of the rotation axis, such that, compared to the beam width of the laser beam upstream of the beam-shaping optical element, the laser beam has a reduced beam width on the deflection mirror, and the reflective mirror surface of the deflection mirror has a mirror width, which is oriented in the direction of the rotation axis and which is narrower than the beam width of the laser beam upstream of the beam-shaping optical element, and a mirror length, which is oriented in the longitudinal axis of the deflection mirror and which is at least as long as the beam width of the laser beam upstream of the beam-shaping optical element.

2. The device according to claim 1, wherein the beam-shaping optical element is disposed downstream of the deflection mirror, said optical element being configured and operable to forward substantially collimated, the laser beam from the deflection mirror, with a beam width corresponding to the unreduced input beam width in the direction of the rotation axis.

3. The device according to claim 1, wherein a plurality of beam-shaping optical elements are disposed downstream of the deflection mirror, said optical elements being configured and arranged such that the laser beam from the deflection mirror is forwarded in a manner substantially collimated and with a beam width deviating from the unreduced input beam width, or convergently to a focal point.

4. The device according to claim 2, wherein the beam-shaping optical element disposed downstream of the deflection mirror is configured as a cylindrical lens or diffractive optical element.

5. The device according to claim 1, wherein the deflection mirror has a reflective front side configured substantially elliptically, a mirror length of the front side that runs orthogonally with respect to the rotation axis being a multiple of a mirror width of the front side that is oriented in the direction of the rotation axis.

6. The device according to claim 1, wherein a rear side of the deflection mirror that is remote from a reflective front side of the deflection mirror is rounded in streamlined fashion.

7. The device according to claim 1, wherein the deflection mirror is stiffened in a longitudinal direction running orthogonally with respect to the rotation axis.

8. The device according to claim 1, wherein the beam-shaping optical element disposed upstream of the deflection mirror is configured as a cylindrical lens or diffractive optical element.

9. The device according to claim 1, wherein the laser beam is a laser beam pulsed with femtosecond laser pulses, and a light projector for the focused projection of the femtosecond laser pulses for a resolution of eye tissue is disposed downstream of the deflection mirror.

10. The device according to claim 1, wherein the unreduced input beam width of the laser beam is at least 15 mm.

11. The device according to claim 1, wherein the device comprises a drive coupled to the deflection mirror for displacing the deflection mirror about the rotation axis.

12. The device according to claim 1, wherein the device further comprises an oscillator coupled to the deflection mirror, for the oscillating displacement of the deflection mirror about the rotation axis.

13. The device according to claim 1, wherein the device further comprises:
 a deflection device disposed downstream of the deflection mirror and serving for a deflection of the laser beam in a second deflection direction orthogonal to the deflection direction of the deflection mirror, and
 a relay optical unit for imaging the laser beam deflected by the deflection mirror into an entrance pupil of the deflection device disposed downstream.

14. A method of treating eye tissue by a laser beam, the method comprising deflecting the laser beam with a deflection mirror arranged displaceably about a rotation axis running parallel to a reflective mirror surface of the deflection mirror, such that the laser beam deflected by the deflection mirror runs in a scanning plane being arranged orthogonally with respect to the rotation axis, wherein the method further comprises:
 converging the laser beam towards a longitudinal axis of the deflection mirror, said longitudinal axis being orthogonal to the rotation axis, and
 projecting the laser beam onto the deflection mirror with a beam width that is reduced in the direction of the rotation axis by way of a beam-shaping optical element disposed upstream of the deflection mirror, such that, compared to the beam with of the laser beam upstream of the beam-shaping optical element, the laser beam has a reduced beam width on the deflection mirror,
 deflecting the laser beam by means of a deflection mirror having a reflective mirror surface with a mirror width which is oriented in the direction of the rotation axis and which is narrower than the beam width of the laser beam upstream of the beam-shaping optical element, and a mirror length, which is oriented in the longitudinal axis of the deflection mirror and which is at least as long as the beam width of the laser beam upstream of the beam-shaping optical element, and
 projecting the laser beam in a focused fashion for a resolution of eye tissue by way of a light projector disposed downstream of the deflection mirror.

15. The method according to claim 14, wherein the method comprises forwarding of the laser beam from the deflection mirror, substantially collimated and with a beam width corresponding to the unreduced input beam width in the direction of the rotation axis by means of a beam-shaping optical element disposed downstream of the deflection mirror.

* * * * *